(No Model.)
F. E. FORSTER.
APPARATUS FOR LAYING SNELLS.
No. 345,496. Patented July 13, 1886.
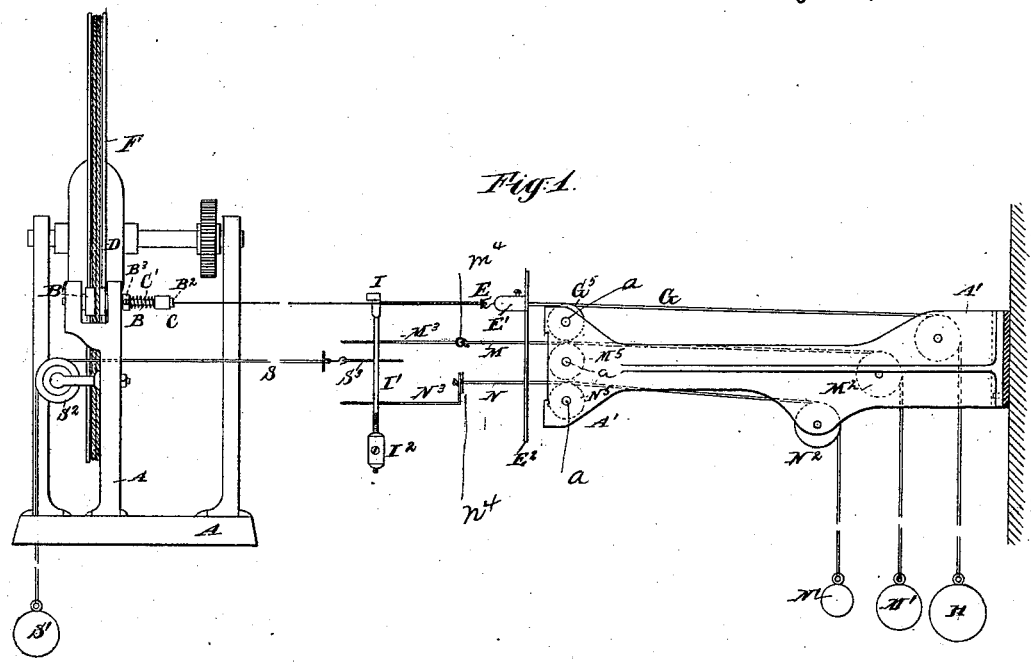
Fig. 1.
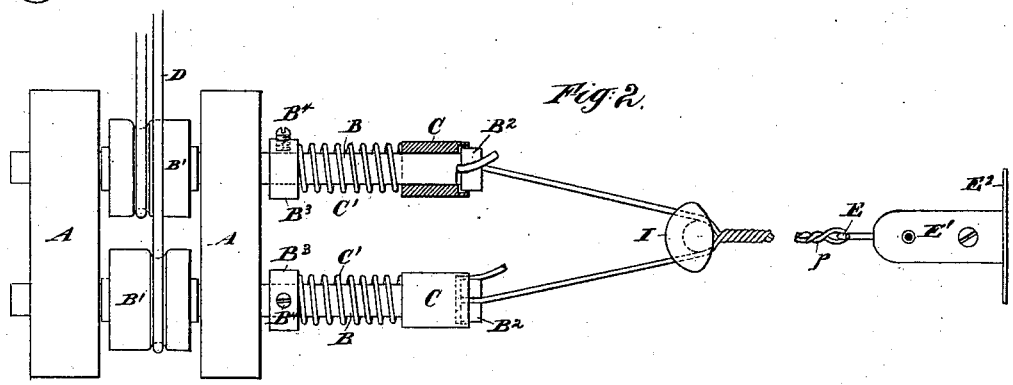
Fig. 2.
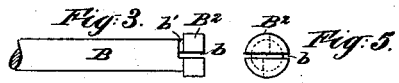
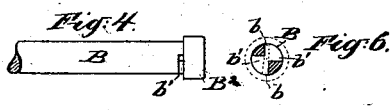
Fig. 7.
Witnesses:
Charles R. Searle,
T. A. Richmond
Inventor:
Ferdinand E. Forster
by his attorney
Thomas Drew Stetson
N. PETERS, Photo-Lithographer, Washington, D. C.

UNITED STATES PATENT OFFICE.

FERDINAND E. FORSTER, OF NEW YORK, N. Y., ASSIGNOR TO HIMSELF AND ALBERT G. FORSTER, OF SAME PLACE.

APPARATUS FOR LAYING SNELLS.

SPECIFICATION forming part of Letters Patent No. 345,496, dated July 13, 1836.

Application filed March 20, 1886. Serial No. 195,963. (No model.)

*To all whom it may concern:*

Be it known that I, FERDINAND E. FORSTER, of the city and county of New York, in the State of New York, have invented a certain new and Improved Apparatus for Laying Snells for Use in Fishing-Tackle, of which the following is a specification.

I produce snells by twisting fine cords of silk or other suitable material and doubling and laying the two parts together. The loop required at one end of the snell to facilitate its attachment to the line is made by putting less twisting in the cord near the end where the doubling occurs.
I have in a patent to me dated March 16, 1886, No. 337,944, described the snell, and indicated means for producing it. I have devised important improvements in the mechanism, which overcome difficulties experienced with the other.

In all previous apparatus known to me, including my apparatus described in my said patent of March, 1886, the ends of the cord require to be knotted or otherwise specially prepared for attachment to the spindles. I have now devised means which secures them sufficiently without any previous preparation. The improvement also economizes material.

I will in this specification, as in the former one referred to, indicate by a star (*) the point on the snell where the hard and uniformly-laid portion ends and the soft-twisted part begins. I provide means for uniformly determining the position of this transition-point, and also for adjusting so as to lengthen or shorten the portion which is soft-twisted.

The accompanying drawings form a part of this specification, and represent what I consider the best means of carrying out the invention.

Figure 1 is a general side elevation. The remaining figures are on a larger scale. Fig. 2 is a plan view of certain portions. Figs. 3 and 4 are elevations showing one of the arbors detached. Fig. 5 is an end view corresponding to Fig. 3. Fig. 6 is a transverse section corresponding to Fig. 4. Fig. 7 shows the completed snell.

Similar letters of reference indicate corresponding parts in all the figures where they occur. Such portions as are not fully described or represented may be the same as in the patent of March, 1886, referred to.

A is a frame-work supporting the twisting mechanism. A' is a frame-work which may be connected to A by parts not represented. The parts A A' may be adjusted at any required moderate distance apart to adapt the apparatus to manufacture snells of different lengths.

B B are parallel arbors revolved in bearings in frame A, at a little distance apart, by means of grooved pulleys B' B', receiving a round belt, D, impelled by a large driving-pulley, F, revolved by a crank or other suitable means. (Not shown.) The belt makes two circuits— one for each arbor—and drives the two at a uniform rate in the same direction. The projecting end of each arbor is peculiarly formed. The two are similar, and a description of one will suffice for both. Each is enlarged at the outer end, as indicated by $B^2$, and is divided longitudinally or split to a little distance beyond the enlarged part by a saw-kerf, $b$, and is cut circumferentially or side-notched a little distance adjacent to the enlargement, as indicated by $b'$. A short tube, C, is fitted on each arbor, as represented, and is urged outward by a spiral spring, C', which finds its abutment in an adjustable collar, $B^3$, which is fixed in the required position on the arbor by a pinching-screw, $B^4$. One end of the small cord which is to form the snell is secured to each of these arbors. To effect this a portion of the cord near one end is stretched across the arbor, and is moved so as to enter the split $b$ and urge back the tube C. Next, the extreme other end of the cord is drawn sidewise into a recess, $b'$, and liberated. The tube C, urged by the spring C', moves outward and grips it strongly, allowing the remainder of the cord to extend out from the central line of the arbor. By shifting the abutment $B^3$ outward, or to the right in Figs. 1 and 2, against the force of the spring C', the grip due to the action of the tube is increased. Shifting the abutment inward, or to the left in Figs. 1 and 2, relaxes the force of the grip. This mode of attachment is sufficiently firm to answer all the requirements of the case, and yet is sufficiently gentle to allow the parts to be detached by a vigorous shake and pull when the snell is completed.

The top I performs its usual function of restraining the "lay" of the cord as it is laid up under the influence of the twisting, and makes a single uniform snell. The point at which it is adjusted before the twisting is important. This is determined by the aid of an arm or bar, I', which extends downward from the top I a considerable distance, and carries an adjustable weight, I². The bight of the cord is held by the swiveling hook E, carried in the murillion E', which is connected by the cord G, running over a pulley to the weight H. As the cord is twisted by the rapid rotation of the parts B C, it naturally shortens and draws the murillion toward it, which is allowed by the rising of the weight H. There are two other pulleys, M² and N², in the framing A', over which respectively run cords M and N, extended, as shown, by weights M' and N'. The cord M is connected to a screw-threaded rod, M³, and the cord N to a screw-threaded rod, N³. Each of these rods is tapped through the bar I' at the points represented. A screw-threaded rod, S³, is tapped through the bar I' at an intermediate point, being inserted in the opposite direction. To it is connected a cord, S, which runs over a pulley, S², supported in the framing A, and is extended by a weight, S'. From the murillion E' a plate, E², extends downward. The cords M and N run loosely through holes provided in this plate. The points of engagement of the cord M with the screw M³ and of the cord N with the screw N³ are enlarged, so that they cannot pass through this plate.

Operation: When the cord has been properly engaged by its ends to the parts B C, and its bight engaged in the swiveling hook E, and the top I brought into position, the latter automatically adjusts itself at a certain fixed distance from the hook E, the distance being graduated by turning the screws M³ N³. The joint effect of the weights M and N' is greater than that of the weight S', pulling in the opposite direction and draws the top I away from the arbors B and toward the hook E. This force, if unrestrained, would move the top I close to the hook E; but this is prevented by the plate E², which forms a stop which is struck by the ring M⁴ at the junction of the screw M³ with the cord M. A corresponding effect is produced at a lower level by the ring N⁴ at the junction of the screw N³ with the cord N. The position of these determine the relations of these parts and the position where the top I is adjusted for commencing to lay the snell. Now the wheel F is turned and the arbors B C rotated, increasing the twist of each part of the cord. When this twisting action has attained a certain degree, the two parts of the cord will commence to be laid or twisted together, and the top I will move toward the arbors as the laying proceeds. In this movement of the top I the three cords G, M, and N will yield or be drawn to the left to an extent nearly equal to the full length of a finished snell. When the laying is completed, the top and its connections are allowed to run out again, or to the right. The top will again adjust itself at the proper distance from E, and all will be again ready for use in making the next snell. The operations may be repeated indefinitely. After the laying of each snell the attendant can remove it by simply slipping off the loop or soft-twisted part from the hook E, and with one or more vigorous movements detaching the other ends from the arbors B C. Then all is ready for introducing another cord and repeating the operation. In adjusting the screws S³ M³ N³ they may be seized by the rings S⁴ M⁴ N⁴, or by any other suitable means, and rotated any number of times in one direction or the other. This correspondingly changes the distance of the ring from the bar I', and consequently increases or diminishes the length of the portion $p$ of the snell, which is slack-twisted. It will be understood that the snell is soft-twisted from the hook E to the point *, at which the top I is adjusted to commence the action, and that it is hard-twisted from that point * to the parts B C, as indicated by P. It is well to steady the cords G, M, and N. I provide for doing this and for holding them up reliably in the best positions by extending the frame A and widening it, as shown, and providing pulleys G⁵ M⁵ N⁵, turning on pins $a$, supported in the framing. This portion of the framing which carries these pulleys G⁵ M⁵ N⁵ also serves as a stop to determine the position to which the murillion and its attachments may retreat under the influence of the weights H M' N' when liberated.

Although I have described the adjustment of the top I as depending entirely on the screws M³ and N³, it will be obvious that such adjustment may depend to some extent on the screws S³. Any change in the position at which the bar I' comes to rest will affect the position of the top I and length of the soft-twisted part of the finished product.

My improved holding means, B $b$ $b'$, with the tube C, and with provisions for urging the latter outward with gentle force, enable me to hold the ends of the cord with sufficient force for the twisting and laying operation with economy of material and with reduced labor in attaching and detaching from the machine.

The cords M N and screws M³ N³ determine the position of the top I uniformly in the same position for each snell, thus giving a reliable uniformity to the length of the slack-twisted portion $p$ in each. The screws allow the length of the slack-twisted portion to be varied, but when once adjusted they remain uniform.

Modifications may be made in the forms and proportions without departing from the principle or sacrificing the advantages of the invention. I can dispense with the pulleys G⁵ M⁵ N⁵ and the portion of the frame A which supports them. I can employ other means of rotating the arbors B.

I claim as my invention—

1. The two revolving arbors B, each having a split, $b$, abutment $B^3$, and side notch, $b'$, in combination with the tubes or sleeves C and springs $C'$, and a hook, E, for holding another portion of the cord, all arranged for joint operation, substantially as herein specified.

2. The two arbors B, with provisions for rotating them, each having a split, $b$, and side notch, $b'$, two tubes, C, springs $C'$, abutments $B^3$, and adjusting means, $B^4$, in combination with the swiveling hook E, and the cord G, pulley $G^5$, and weight H, for giving a yielding tension, as herein specified.

3. The revolving, holding, and twisting devices B, the hook E, plate $E^2$, the top I, bar $I'$, the screw $M^3$, and weighted cord M, for determining the position of top I, all combined and arranged for joint operation, as specified.

4. The auxiliary screws $M^3 N^3$, in combination, with the screw $S^3$, cord S, murillion $E'$, having the plate $E^2$, the weights $M' N' S' H$ and their respective cords, and the twisting means, B C, pulleys $B'$, and power-connections, hook E, and top I $I'$, as herein specified.

In testimony whereof I have hereunto set my hand, at New York city, this 18th day of March, 1886, in the presence of two subscribing witnesses.

FERDINAND E. FORSTER.

Witnesses:
CHARLES R. SEARLE,
H. A. JOHNSTONE.